June 16, 1925.                                                         1,542,588
E. SCHOTT
METHOD OF MAKING SUSPENSION INSULATORS OF GLASS
Filed Feb. 6, 1925

Inventor:

Erich Schott

Patented June 16, 1925.

1,542,588

UNITED STATES PATENT OFFICE.

ERICH SCHOTT, OF JENA, GERMANY, ASSIGNOR TO THE FIRM JENAER GLASWERK SCHOTT & GEN., OF JENA, GERMANY.

METHOD OF MAKING SUSPENSION INSULATORS OF GLASS.

Application filed February 6, 1925. Serial No. 7,438.

*To all whom it may concern:*

Be it known that I, ERICH SCHOTT, a citizen of Germany, and residing at Jena, Germany, have invented a new and useful Method of Making Suspension Insulators of Glass (for which I have filed an application in Germany February 9, 1924), of which the following is a specification.

The subject of the present invention is a method of making suspension insulators of glass which are provided with a clapper, engaging with a thickened end in the glass body. The invention therefore relates to that kind of insulators in which, after their completion, it is impossible to pull out again the clapper without the necessity of cementing or screwing it into the glass body. According to the invention such insulators are made in the following way. The glass body is at first formed in such a manner as to receive a hollow space into which the clapper can be inserted with its thickened end. Thereupon one inserts the clapper and presses the glass round the clapper in such a way that it will be impossible to pull it out again from the hollow space after the glass has become hard. With the method according to the invention the glass body is therefore brought into its final shape in two separate working periods, whilst when using glass for making the insulator body one is tempted to bring this body into this shape by a single working process by putting the clapper from the outset into the press mould and by then firmly pressing the glass round it. However, the method according to the invention has the particular advantage over the aforesaid other method that with the former it is easily possible to leave a more or less large interval between the glass body and the clapper, so as to be able to avoid in a simple way any objectionable influences of the clapper upon the glass body, which may possibly arise owing to changes of temperature. If, however, the glass is pressed round the clapper in the press mould, owing to the firm pressing of the glass there may easily arise undesirable tensions in the glass or cracks which considerably reduce both the mechanical and electric firmness of the insulator.

Figure 1:
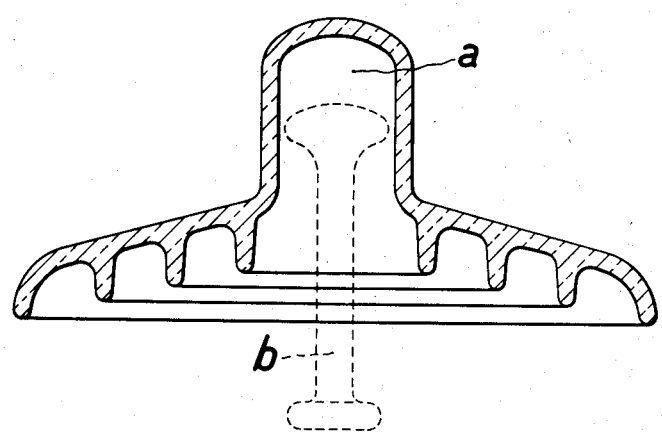
Figure 2:
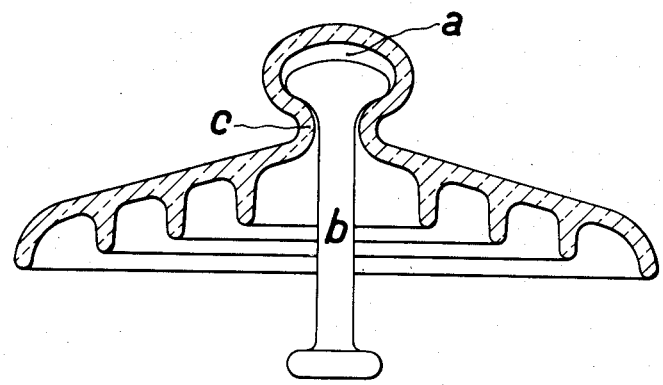

In the annexed drawing the method according to the present invention shall be elucidated. Fig. 1 shows in a cross section an insulator in a preliminarily pressed state; Fig. 2 represents likewise in a cross section the same insulator in its final shape.

As may be seen, the insulator is provided in its preliminarily pressed state with a hollow space $a$ which is of uniform width for its whole length, so that the thickened end of a clapper, shown in Fig. 1 by dotted lines and denoted by $b$, can be pushed into the hollow space. In Fig. 2 the clapper $b$ is pushed into the hollow space $a$ and the lower part $c$ of this space narrowed in such a way that the clapper cannot be pulled out any more. The part of the hollow space $a$ not filled up by the clapper, is suitably filled with a soft material, e. g., cement or the like which is not shown in the drawing.

I claim:

Method of making suspension insulators of glass, consisting in this that a glass body is first shaped in such a way as to receive a hollow space, adapted to receive a clapper, that thereupon a clapper is inserted and finally the glass is pressed round the clapper, so that after the hardening of the glass the said clapper cannot be pulled out from the said hollow space.

ERICH SCHOTT.